LEVEL DETECTOR AND SWITCH

Filed March 7, 1963

INVENTOR:
CHARLES A. MATHEWS,
BY Albert S. Richardson Jr.
ATTORNEY.

United States Patent Office 3,492,510

Patented Jan. 27, 1970

3,492,510
LEVEL DETECTOR AND SWITCH

Charles A. Mathews, Springfield, Pa., assignor to General Electric Company, a corporation of New York Filed Mar. 7, 1963, Ser. No. 263,450
Int. Cl. H03k 3/26
U.S. Cl. 307—301 10 Claims This invention relates generally to level detector and switch circuits, and more particularly to such circuits employing solid state semi-conductive elements.

Figure 1:
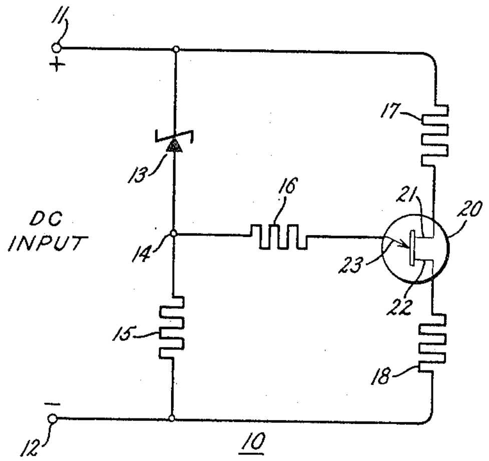

In many electrical circuit applications, it is desirable to develop, upon the attainment of a predetermined level by an input signal of varying magnitude, a control voltage which then relates linearly to the input signal magnitude. For example, in the input circuit for an inverse time delay overcurrent protective device whose purpose is to monitor the condition of an external electrical circuit and operate, on the incidence of an abnormal condition, with a delay which is an inverse function of the amount of overcurrent, it is desirable that a voltage linearly representative of the magnitude of current in the external circuit be allowed to energize the protective device whenever the current magnitude exceeds a predetermined "pick-up" level.

To this end, it is a known practice in prior art control circuit arrangements to utilize a load device comprising an electric energy storing circuit including a D-C energized reactance element, such as a capacitor, with the energization of this circuit being controlled by a D-C signal derived from current in the external circuit being monitored. The capacitor serves to delay operation of a suitable element, such as an electroresponsive relay, according to the magnitude of the D-C signal. The relay operates or picks up after a delay coinciding with the time the capacitor takes to charge to a predetermined voltage level. It is necessary to prevent the capacitor from accumulating charge for currents below the pick-up level of the device if its operating time is to be independent of variations of circuit current below pick-up. A general object of the present invention is therefore to provide improved means, having no moving parts, for abruptly switching the energizing signal of such a device, when an externally derived input quantity has attained a predetermined pick-up level, from substantially zero to a magnitude which then bears a linear relationship to the input quantity magnitude.

U.S. Patent No. 2,655,609 describes a circuit configuration, referred to as a conjugate pair bistable circuit, comprising a pair of transistors of opposite conductivity having a Zener diode connected across one of the junctions of the transistors and poled in the reverse direction for voltages of the normal polarity impressed between a pair of input terminals. The Zener diode provides for presetting the voltage required to trigger the transistors and thus controls the level at which the pair switches from the low-current, high-resistance state, to the high-current, low-resistance state. One recognized drawback of the conjugate pair bistable circuit is that it has a low drop-out point, that is, when the conjugate pair switches at the level equal to the Zener breakdown voltage, the conjugate pair shorts the Zener diode and continues to conduct as the input voltage is reduced. The action is somewhat analogous to that of a controlled rectifier in which the gate terminal loses control after firing. This low drop-out characteristic, which is inherent in the conjugate pair, is undesirable when actuating a protective device or relay where high drop-out is required.

Accordingly, it is another object of this invention to provide an improved transistorized circuit which overcomes the disadvantages of the conventional conjugate pair bistable circuit described hereinabove.

Yet another object of this invention is to provide an improved transistorized circuit which will develop a D-C control voltage which varies linearly in relation to a varying input voltage after the input voltage exceeds a predetermined level.

A further object of this invention is to provide an improved transistorized control circuit for energizing a load device in response to the condition of an external electrical circuit.

An additional object of this invention is to provide an improved transistorized control circuit for energizing an energy-storing circuit in response to the condition of an external electrical circuit wherein the operating time of the energy-storing circuit is independent of external circuit load current variations below a predetermined level.

In carrying out the invention in one form, there is provided means adapted to be coupled to an external electrical circuit for deriving therefrom a D-C signal or voltage which is representative of a characteristic circuit quantity (such as current). The D-C signal is applied across the input terminals of a transistorized level detector and switch circuit comprising a voltage divider and a unijunction transistor. The voltage divider includes a serially-connected resistor and voltage reference element having an abrupt reverse voltage breakdown characteristic arranged so that the input voltage less the voltage drop across the voltage reference element appears at the junction of the resistor and reference element and is applied to the emitter electrode of the unijunction transistor. The voltage reference element has a constant voltage characteristic after breakdown so that as the input voltage increases, the voltage across the emitter terminal increases disproportionately. When the rise in voltage at the emitter electrode is sufficient to cause the transistor to fire, an output or control voltage, which is a linear function of the input voltage above a predetermined level, is developed across a resistor connected in emitter or base electrode circuits of the transistor. This control voltage may be utilized with any suitable control circuit or control device where it is desired to initiate a control function in response to the attainment of the predetermined level of an input voltage. One illustration of a circuit embodying the present invention is shown in a copending patent application S.N. 138,476, Dewey, filed Sept. 15, 1961 and assigned to the assignee of this invention, now Patent No. 3,105,920.

Figure 1A:
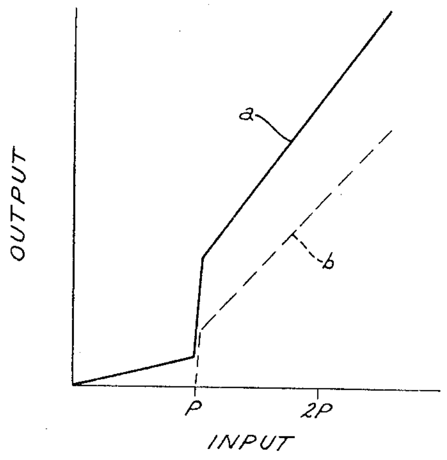
Figure 2:
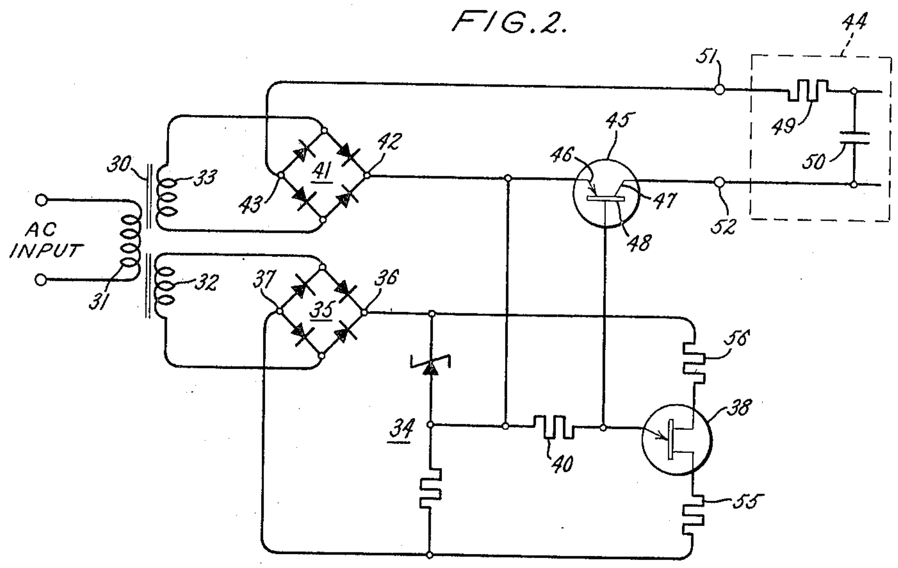

While the specification concludes with claims particularly pointing out and distinctly claiming the subject matter regarding the invention, it is believed the invention will be better understood from the following description taken in connection with the accompanying drawings:

FIG. 1 is a circuit diagram of the transistorized level detector and switch circuit;

FIG. 1*a* is a graphical representation of the operating characteristics of the level detector and switch circuit of FIG. 1; and FIG. 2 is a circuit diagram of the transistorized level detector arranged to operate a transistor switch circuit.

Referring now to FIG. 1, the circuit arrangement of one embodiment of the present invention is shown and comprises a level detector and switch circuit 10 which includes a voltage divider circuit and unijunction switching transistor. Input terminals 11 and 12 are connected to a source of D-C voltage, polarized as shown, which may be a voltage representative of a characteristic circuit quantity (such as current), and are arranged to apply the input voltage across the voltage divider circuit and the inter-base circuit of the unijunction transistor.

The voltage divider comprises serially-connected voltage reference element 13 and resistor 15 with the voltage reference element 13 being connected to the positive input terminal 11 and poled in opposition therein. This voltage reference element 13, which may be a breakdown diode of the Zener type, has an abrupt reverse voltage breakdown characteristic which enables it to block the flow of reverse current as long as the reversely-poled applied voltage is less than the predetermined critical breakdown level. When the voltage reaches that level, the diode freely permits reverse conduction, while limiting the voltage drop thereacross to an essentially constant level equal to the breakdown voltage.

The junction 14 of the voltage reference element 13 (the positive anode terminal) and resistor 15 is connected by way of resistor 16 to the emitter electrode of the unijunction transistor 20, and consequently, the emitter voltage of the unijunction transistor 20, prior to activation thereof, will be equal to the input voltage applied to the input terminals 11, 12 less the critical breakdown voltage of reference element 13.

The unijunction transistor is a semiconductor device well known in the art, and its theory of operation is fully described in the U.S. patent to I. A. Lesk, 2,769,926, entitled "Non-Linear Resistance Device" and assigned to the assignee of the present invention. The unijunction transistor 20 includes base electrodes 21, 22 and emitter electrode 23. The base electrode 21 may be connected to the positive input terminal 11 through base resistor 17, and base electrode 22 may be connected to the negative input terminal 12 through base resistor 18, thus connecting the base terminals 21, 22 to the varying D-C voltage at input terminals 11, 12. The relative resitsance values of the respective base resistors 17 and 18 are chosen to improve the stability of the unijunction transistor circuit in the event of temperature variations, and for this purpose they are preferably equal to each other.

The full input voltage is applied to the base circuit of the unijunction transistor 20, while the input voltage less the voltage drop across the reference element 13 is applied to the emitter electrode. As the input voltage increases, the emitter voltage becomes an increasingly higher percentage of the base voltage and ultimately, upon a critical ratio being attained (as explained below), causes the unijunction transistor to fire. The output voltage can be taken either from the base circuit or the emitter circuit. Although FIG. 1 shows a resistor connected in each of the base and emitter circuits of the unijunction transistor 20, it should be readily apparent that, consistent with standard design techniques of protecting the emitter-base junctions, the output voltage may be taken from any one of the resistors 16, 17 and 18, and all of the resistors may not be needed in the circuit.

Operation of the circuit is such that when a D-C input voltage is applied at the input terminals 11 and 12, the voltage reference element 13, by virtue of its reverse voltage breakdown characteristics, blocks the flow of reverse current until the reversely-poled applied voltage exceeds the critical breakdown level. The reference element then freely conducts, while limiting the voltage drop thereacross to an essentially constant level equal to its breakdown voltage. Thus, the emitter voltage of the unijunction transistor 20 is equal to the input voltage at the input terminals 11 and 12 less the critical breakdown voltage of reference element 13. So long as the potential of the unijunction transistor emitter 23 is less positive with respect to base 22 than the characteristic peak point emitter voltage, the unijunction transistor 20 remains cut off, and only a small reverse leakage current will flow through the emitter circuit.

The peak point emitter voltage of the unijunction transistor is known to be dependent upon its interbase voltage, being a fixed fraction thereof. This fraction is termed the "intrinsic stand-off ratio," and in order to activate the unijunction transistor 20, its emitter voltage must increase to a point which is equal to the product of its interbase voltage and the intrinsic stand-off ratio. The emitter voltage, which is normally below this point, increases as the input voltage applied at terminals 11 and 12 increases, and due to the constant voltage characteristics of the Zener diode 13, the emitter voltage progressively becomes a greater fraction of the interbase voltage. When the potential at the emitter electrode 23 of the unijunction transistor 13 becomes more positive with respect to base 22 than the peak point emitter voltage, the unijunction transistor 20 fires, resulting in an abrupt increase in the emitter current in the forward direction.

The parameters of the level detector circuit 10 are selected so that the above-described firing of the unijunction transistor 20 occurs in immediate response to the attainment of a predetermined voltage level at the input terminals 11 and 12, referred to as the pick-up level. For example, given a pick-up level of 20 volts and assuming that the unijunction transistor 20 which is used will fire when the voltage at the emitter electrode reaches 50 percent of its interbase voltage, then a voltage reference element 13 is chosen having a 10-volt reverse voltage breakdown characteristic. With variations of input voltage above 10 volts, the voltage reference element maintains a constant 10-volt drop thereacross. When the input voltage level at terminals 11 and 12 reaches 20 volts, the voltage at the emitter electrode 23 of unijunction transistor is 10 volts by virtue of the voltage divider action of reference element 13 and resistor 15, causing the transistor 20 to fire. Reference element 13 permits accurate operation of the level detector circuit at a well-defined pick-up point.

FIG. 1*a* is a graphical representation of the operating characteristics of the level detector and switch circuit of FIG. 1 plotting input along the abscissa and output along the ordinate, with the abscissa being scaled in multiples of pick-up voltage "P." The solid line *a* of FIG. 1*a* illustrates the output characteristic of the level detector and switch circuit of FIG. 1 when the output is taken across a resistor in the base circuit of the unijunction transistor, while dashed line *b* is representative of the condition when the output is taken across the resistor 16 in the emitter circuit.

Referring to the output characteristic curve *a*, it will be noted that the output voltage, with increasing values of input voltage, gradually increases (due to leakage) until such time as the predetermined pick-up input level is reached. At this point the unijunction transistor fires, resulting in an abrupt rise in output voltage. With a continued increase in input voltage above the predetermined level, the output voltage increases as a substantially linear function of the input voltage. It will be noted that due to the leakage current in the base circuit of the unijunction transistor, there is a low-magnitude output voltage prior to the firing of the unijunction transistor. This relatively low output voltage can be tolerated if the output load device being supplied by my circuit is unresponsive to such low magnitudes.

In FIG. 1*a* the curve *b* illustrates the output characteristic of the level detector and switch circuit of FIG. 1 when the output is taken from the emitter circuit of the unijunction transistor. The operating characteristic curve *b* is displaced from curve *a* due to the constant breakdown voltage of the reference element 13 which is subtracted from the variable input voltage, thereby changing the proportionality of the output to the input while still maintaining a linear relationship therebetween. The output voltage taken from the emitter circuit as depicted by curve *b* is seen to be substantially zero prior to the pick-up point, due to the reverse leakage current then flowing in this circuit.

For safe operation of the unijunction transistor 20 shown in FIG. 1, it is necessary that the emitter current be limited to a predetermined maximum rated value, which value will be a determinable multiple of the value of emitter current immediately after the unijunction transistor has fired. It is also necessary to limit the voltage applied to the unijunction transistor base circuit to a predetermined maximum safe value. Specifically, this means the maximum safe operating voltage which can be applied at terminals 11, 12 must not exceed a predetermined multiple of pick-up *p*, e.g., three times the voltage level at which the transistor fires. In another form of my invention, described hereinafter, this relatively narrow operating range has been effectively extended.

The electrical circuit configuration of FIG. 1 described above actually performs the dual function of voltage detection and switching. The full input voltage across terminals 11, 12 is applied to the base circuit of unijunction transistor 20, while the input voltage less the voltage drop across Zener diode 13 is applied to the emitter circuit of unijunction transistor 20. As the emitter voltage becomes a greater percentage of the base voltage and the intrinsic stand-off ratio is reached, the unijunction transistor fires. The output voltage can be taken either from the base circuit or the emitter circuit.

The above-described voltage detection and switching of the circuit configuration of FIG. 1 operates well in any circuit application wherein the maximum input quantity to which a connected load must linearly respond is no greater than about 3 times the pick-up level. Where a broader range of linear response is needed, my invention is adapted to perform equally well by utilizing the output of the FIG. 1 circuit to control a switching transistor, rather than to directly supply the load or output circuit.

FIG. 2 illustrates an arrangement of one form of the invention where the output, taken from the emitter circuit of the unijunction transistor is used to fire a switching transistor. Energization of the switching transistor translates a voltage representative of an external circuit condition to a suitable load, which may be an energy-storing circiut comprising resistive and reactive elements.

As shown in FIG. 2, transformer 30 having primary winding 31 and two secondary windings 32, 33, has its primary winding 31 connected to an external electrical circuit which is to be monitored. One secondary winding 32 is connected to a conventional full-wave rectifier 35. The D-C terminals 36, 37 of rectifier 35 are connected across unijunction transistor 38 and supply to the interbase circuit of unijunction transistor 38 and the voltage divider 39 a varying D-C voltage dependent on the value of input voltage across primary winding 30. Transistor 38, its associated components, and voltage divided 39 operate in a manner similar to that of transistor 20 and its associated components hereinbefore described.

I prefer to design this energizing source for the transsistor 38 so that input current values in excess of a safe level are not reflected in the D-C voltage applied to the unijunction transistor. This limiting or protective feature of my invention may be achieved by designing the transformer core associated with the secondary winding 32 to become saturated at the damaging current values, or other means, such as a Thyrite resistor or a Zener diode, might be used for this purpose. In all events the maximum D-C voltage input supplied by rectifier 35 is suitably limited for safe operation of the unijunction transistor 38.

The other secondary winding 33 of transformer 30 is connected to the full-wave rectifier 41 to develop a second D-C voltage across the D-C terminals 42, 43 representative of the input quantity over a wide range of magnitude variation. This is supplied to a pair of output terminals 51, 52, to which a load circuit 44 may be connected, through switching transistor 45. Switching transistor 45 as shown comprises a conventional PNP transistor having its emitter 46 and collector 47 serially connected between terminal 42 of the full-wave rectifier 41 and the output terminal 52. The emitter-base circuit 46, 48 of transistor 45 is connected across the emitter resistor 40 of unijunction transistor 38 to thereby activate or switch the transistor 45 to its conducting state in response to the voltage developed across resistor 40 by forward current flowing in the emitter of transistor 38. As a result of this action, a D-C output signal is provided at the output terminals 51, 52 for energizing the connected load circuit 44.

Circuit 44 is intended to represent a load which requires an energizing signal linearly related to the A-C input quantity being applied to the FIG. 2 arrangement. For convenience it is illustrated as an energy storing or timing circuit comprising resistor 49 and capacitor 50 serially connected between output terminals 51 and 52. Any suitable device desired to be controlled, for example, the operating coil of a relay (not shown), may be connected across the capacitor 50. A more specific embodiment of the load circuit 44 is disclosed in detail in the copending Dewey application S. N. 138,476 cited hereinbefore.

In operation, the switching transistor 45 is normally inactive or turned "off" (non-conducting) and, consequently, the load circuit 44, which is supplied by the external A-C input by way of full wave rectifier 41 and transformer 30, is maintained in a deenergized state. The firing of switching transistor 45 will be occasioned by an abnormal condition occurring in the monitored external A-C circuit connected to the primary winding 31 of transformer 30. A rise in the input quantity applied to primary winding 31 above a predetermined critical level fires unijunction transistor 38 in a manner hereinbefore described in connection with FIG. 1, resulting in a voltage drop across resistor 40. When a voltage is developed across resistor 40 of the unijunction transistor 38 sufficient to activate the transistor 45 into its conductive state, the load circuit 44, comprising resistor 49 and capacitor 50, is energized by the voltage across the D-C terminals 42, 43 of the full wave rectifier 41. Capacitor 50 will then begin accumulating a charge and the integrated voltage developed thereby may serve to control the operation of whatever device is connected thereto. The device can be arranged to operate after a time delay coinciding with the time that capacitor 50 takes to charge a predetermined amount which, for a given time constant, is determined by the input magnitude. By preventing capacitor 50 from charging for values of input below the pick-up level, the operating time of this arrangement will not be affected by variations of input below pick-up level.

As is shown in FIG. 2, the switching transistor 45 is preferably controlled by the voltage developed across resistor 40 connected in the emitter circuit of the unijunction transistor 38, whereby the transistor 45 normally is biased off by the reverse leakage current which flows in the emitter circuit of transistor 38 prior to its firing. While the control voltage for the unijunction transistor 45 could alternatively be taken from across resistors 55 or 56 connected in the base circuits of the unijunction transistor 38, this would require the addition of appropriate limiters and means for assuring that 45 is maintained non-conductive until 38 fires.

The circuit of the instant invention achieves accurate and constant operation for any output means requiring energization by a voltage which responds linearly to variations, above pick-up, of energy levels of an input quantity. At the predetermined pick-up level, the switching means 45 is automatically activated by the firing of unijunction transistor 38. Any increase in input value above this predetermined level will not harm the unijunction transistor 38, yet it is translated directly to the load circuit 44.

Although particular embodiments of the subject invention have been described, many modifications may be made and it is understood to be the intention of the appended claims to cover all such modifications that fall within the true spirit and scope of the invention.

What I claim as new and desire to secure by Letters Patent of the United States is:

1. A control circuit for developing an output voltage in response to a variable direct current input voltage above a predetermined level comprising: a switching circuit and a level detector circuit means, said switching circuit comprising a unijunction transistor including an emitter electrode and first and second base electrodes, said first and second base electrodes being connected in parallel relationship with said level detector circuit means for energization by the variable direct current input voltage, said level detector circuit means comprising a serially connected impedance element and a reversely poled reference element having a predetermined voltage breakdown characteristic for developing at the junction of said impedance and reference elements a voltage equal to the variable direct current input voltage less the breakdown voltage of said reference element whenever the magnitude of said input voltage exceeds said breakdown voltage, means conecting said emitter electrode to the junction of said impedance and reference elements for activating said unijunction transistor in response to the voltage at said junction attaining a magnitude equal to said predetermined level of input voltage less said breakdown voltage, and means conected in circuit with one of said electrodes for deriving the output voltage upon activation of said unijunction transistor.

2. The control circuit as set forth in claim 1 wherein the last-mentioned means comprises another impedance element connected between said emitter electrode and the junction of said impedance and reference elements for developing thereacross, in response to the activation of said unijunction transistor, an output voltage which is linearly related to the input voltage above said predetermined level.

3. The control circuit as set forth in claim 1 wherein the last-mentioned means comprises another impedance element conecting said first base electrode to one end of said level detector circuit for developing thereacross, in response to the activation of said unijunction transistor by the input voltage applied at the one end of said level detecting circuit, an output voltage which is linearly related to the input voltage above said predetermined level.

4. A control circuit for developing an output voltage in response to a variable direct current input voltage above a predetermined level comprising: a switching circuit and a level detector circuit means connected in parallel for energization by the variable direct current input voltage, said switching circuit comprising a unijunction transistor including an emitter electrode and first and second base electrodes, said level detector circuit means comprising a resistor and a reversely poled Zener diode reference element, said Zener diode having a predetermined voltage breakdown characteristic for developing at the junction of said resistor and diode a voltage equal to the variable direct current input voltage less the breakdown voltage of the diode whenever the magnitude of said input voltage exceeds said breakdown voltage, first and second impedance elements connecting said first and second base electrodes to opposite ends of said level detector circuit means for applying the variable direct current input voltage thereacross, and means connecting said emitter electrode to the junction of said resistor and diode for activating said unijunction transistor in response to the input voltage attaining said predetermined level, thereby developing across one of said first and second impedance elements a voltage which is a measure of the input voltage then existing in response to the activation of said unijunction transistor.

5. A transistor control circuit comprising: first means of the type which can be coupled to an electrical circuit for developing a first direct current signal having a magnitude representative of the value of a characteristic electric quantity of the electrical circuit over an initial limited range of values of said quantity; control means conected to said first means for sensing the magnitude of said first direct current signal, said control means being arranged to operate only when said magnitude of said first direct current signal reaches a predetermined level corresponding to a predetermined value, within said limited range, of said characteristic quantity; second means of the type which can be coupled to said electrical circuit for developing a second direct current signal having a magnitude representative of the value of said characteristic quantity over a range of magnitudes greater than said limited range; load means disposed to be energized by said second D-C signal; normally inactive translating means for connecting said second means to said load means; and means connecting said translating means to said control means for activating said translating means in response to the operation of said control means to thereby energize said load means.

6. A transistor control circuit comprising: first and second means of the type which can be coupled to an electrical circuit for developing first and second direct current signals having magnitudes respectively dependent on the value of a characteristic electric quantity of the electrical circuit; control means including a level detector circuit and a switch circuit connected in parallel to said first means for energization by said first direct current signal, said level detector being arranged for sensing the magnitude of said first direct current signal and developing a dependent control voltage whenever said magnitude exceeds a first predetermined level, said switch circuit being connected to said level detector circuit and arranged for activation only in response to said control voltage attaining a critical relation to said first direct current signal, which relation obtains when the first direct current signal magnitude reaches a second predetermined level; load means disposed to be energized by said second direct current signal; normally inactive translating means for connecting said second means to said load means; and means connecting said translating means to said control means for activating said translating means upon activation of said switch circuit to thereby energize said load means.

7. The transistor control circuit as set forth in claim 6 wherein said load means comprises an electric energy storing circuit including a resistor and a serially connected capacitor, and said translating means comprises a transistor, said capacitor being arranged to be energized in response to the activation of said transistor for developing an integrated voltage the magnitude of which is a function of the time the capacitor takes to charge.

8. A control circuit comprising: means of the type which can be coupled to an electrical circuit for developing at least one direct current input signal having a magnitude dependent on the value of a characteristic electric quantity of the electrical circuit; control means including a level detector circuit and a switch circuit connected in parallel to said means for developing the input signal, said level detector circuit comprising a serially connected impedance element and a reversely poled reference element having a predetermined voltage breakdown characteristic for developing at the junction of said impedance and reference elements a voltage representative of said characteristic quantity less a constant over a predetermined limited range of values of said characteristic quantity, said switch circuit comprising a unijunction transistor including an emitter electrode and first and second base electrodes connected across said level detector circuit, said emitter electrode being connected to the junction of said impedance and reference elements whereby said unijunction transistor is activated in response to said characteristic quantity attaining a predetermined critical value within said limited range of values; output terminals disposed to be connected to said means for developing said input signal to provide a direct current output signal representative of said characteristic quantity above its predetermined critical value; and normally inactive translating means for connecting said output terminals to said input-signal-developing means, said translating means being connected to said control means for activation in response to the activation of said unijunction transistor.

9. The control circuit as set forth in claim 8 in which the connection between said emitter electrode and said junction includes another impedance element, and the translating means is connected to said included element for activation in response to forward current flow in said emitter electrode.

10. The control circuit of claim 9 wherein the translating means comprises a transistor the emitter-collector circuit of which connects said output terminals to said output-signal-developing means, and wherein the emitter-base circuit of said transistor is connected across said included impedance element.

References Cited

UNITED STATES PATENTS

| | | |
|---|---|---|
| 3,061,747 | 10/1962 | Schlicher. |
| 3,099,791 | 7/1963 | Turner. |
| 3,105,187 | 9/1963 | Schauwacker. |
| 3,105,920 | 10/1963 | Dewey. |
| 3,106,675 | 10/1963 | Riebs et al. |
| 3,112,412 | 11/1963 | Dyer. |
| 3,132,287 | 5/1964 | Yarbrough. |

FOREIGN PATENTS

| | | |
|---|---|---|
| 1,047,935 | 12/1958 | Germany. |

OTHER REFERENCES

RCA-Technical Notes, "Unijunction Transistor Time Delay Relay," RCA TN No. 377, June 1960, 2 sheets.

IBM Technical Disclosure Bulletin, "Unijunction Transistor Trigger," vol. 4, No. 7, December 1961.

Solid State Products Inc. (SSPI), Bulletin D–420–02–8–59, A Survey of Some Circuit Application of the Silicon Control Switch, August 1959 (pages relied on 4, 5, 15, 16).

JERRY D. CRAIG, Primary Examiner

U.S. Cl. X.R.

307—296, 318